(12) United States Patent
Detrick

(10) Patent No.: US 6,919,901 B2
(45) Date of Patent: Jul. 19, 2005

(54) GRAPHICS SYSTEM REGISTER DATA GENERATION

(75) Inventor: Mark S. Detrick, Sayre, PA (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 10/046,854

(22) Filed: Jan. 15, 2002

(65) Prior Publication Data

US 2003/0132954 A1 Jul. 17, 2003

(51) Int. Cl.$^7$ .................................................. G09G 5/36
(52) U.S. Cl. ....................... 345/559; 345/522; 345/531; 719/328
(58) Field of Search ................................. 345/501, 530, 345/531, 522, 559, 561; 719/321–323, 328, 327

(56) References Cited

U.S. PATENT DOCUMENTS

| | | | |
|---|---|---|---|
| 4,811,240 A | 3/1989 | Ballou et al. | |
| 5,296,927 A | 3/1994 | Guillotel | |
| 5,359,703 A | 10/1994 | Robertson et al. | |
| 5,566,294 A | 10/1996 | Kojima et al. | |
| 5,793,382 A | 8/1998 | Yerazunis et al. | |
| 5,815,604 A | 9/1998 | Simons et al. | |
| 6,115,053 A | 9/2000 | Perlin | |
| 6,144,385 A | 11/2000 | Girard | |
| 6,167,562 A | 12/2000 | Kaneko | |
| 6,606,649 B1 * | 8/2003 | Schwitters et al. | 709/206 |
| 6,784,893 B2 * | 8/2004 | Marino | 345/561 |
| 6,803,922 B2 * | 10/2004 | Marino | 345/589 |

FOREIGN PATENT DOCUMENTS

JP  3282888 A  12/1991

\* cited by examiner

Primary Examiner—Kee M. Tung
(74) Attorney, Agent, or Firm—William H. Steinberg; Hoffman, Warnick & D'Alessandro LLC

(57) ABSTRACT

A method, graphics system API and digital video system that provide more efficient processor usage and easier application programming. Register data for the hardware can be generated and written to the hardware control registers, recorded as a command list and recalled as a command list. Use of the command lists prevents repetitive calculation of register data and, hence, reduces processor usage and makes application programming easier.

20 Claims, 1 Drawing Sheet

GRAPHICS SYSTEM REGISTER DATA GENERATION

BACKGROUND OF THE INVENTION

1. Technical Field

The present invention relates generally to graphics system register data generation and, more particularly, to register data generation using recorded command lists of register data.

2. Related Art

Digital electronics and, in particular, digital video systems are becoming ubiquitous in today's electronic world. One industry, among many, in which digital video systems are becoming much more prevalent is television services. For instance, practically every television system now offers digital service, which requires a set top box having a digital video system. In this setting, the digital video system provides various functions relative to the digital television services such as television programming information, games, Internet browsing and other multimedia in a graphical format on a television display. Each digital video system generally includes a processor, memory, a hardware graphics system for generating graphics, an application that provides system functionality including graphics creation, and an application program interface (API) for communicating between the application and graphics system. In operation, the digital video system application provides a request for generation of a graphic to the graphics system API, and the graphics system API would then generate register data for the graphics system using the digital video system processor.

An overriding problem with digital video systems is that the graphics system's hardware is very complex and unique for each manufacturer. This creates a couple of issues. One issue relative to implementation is that each time a graphic is requested by an application, the API must have the register data calculated by the processor. When a graphic is used repeatedly, the processing is repeated, which creates very inefficient usage of system processor capacity. This is especially disadvantageous where the digital video system application provides a variety of functions and each function must use the processor. For instance, a processor in an electronic gaming device may calculate graphics, and also a myriad of other gaming calculations. In this regard, any device that can reduce processor utilization is advantageous.

Another issue relates to programming of the application and the application's ability to interact with the API and graphics system. Since graphic systems are very complex, application programmers must design applications that include in-depth knowledge of the complex graphics system hardware. As a simplified example, a graphics system may require the following registers be filled in order to build a graphic: hardware dependent defaults, logic checking (e.g., raster operation), error checking, bit address calculation (e.g., a function that takes x, y, stride, format and calculates an address), shift to proper location, monochrome (e.g., for setting up register for special raster operation), and where to load values into registers. As a result, the application programmer must have a very in-depth knowledge of the required register data for the graphics system and must impart that knowledge into the application, or use predefined APIs that may be very generic and inefficient for a particular use.

In order to personally achieve this knowledge, application programmers spend an immense amount of time either learning register structure of a graphics systems and/or communicating with hardware manufacturers on how to calculate the correct register data. This problem is magnified for programmers where different graphics systems are used. The process of programming a robust application, therefore, can become very time consuming and tedious.

One partial remedy to the above issues has been to provide graphic templates or primitives that can be recalled and modified. However, current digital video systems require such a large number of graphics to be generated on the fly that even a large library of graphics templates is inadequate. Maintaining an updated graphics template library is also burdensome and inefficient.

In view of the foregoing, there is a need in the art for a graphics system API and related application that can generate graphics system register data, record register data and recall register data on the fly to increase digital video system efficiency and simplify application programming.

SUMMARY OF THE INVENTION

A first aspect of the invention is directed to a method of generating register data for registers of a graphics system, the method comprising: at least one of the steps of: generating register data based on a request and writing the register data to the registers of the graphics system for execution; recording a command list of register data in memory as the register data is generated; and recalling a recorded command list of register data and submitting the command list to the graphics system for execution.

A second aspect of the invention includes an application program interface for generating register data for a graphics system based on a request, the interface comprising: a generate module that generates register data and writes the register data to the graphics system for execution; a command list module including: a record module that records register data generated by the generate module as a command list in memory; a recall module that recalls a command list from memory and submits the command list to the graphics system for execution; and a controller that determines which of at least one of the generate module, the record module and the recall module will be utilized to respond to the request.

A third aspect of the invention is directed to a digital video system comprising: a processor; a memory; a graphics system for generating graphics; an application resident in memory; an application program interface for the graphics system including: means for generating register data and writing the register data to the graphics system; means for recording in memory register data created by the means for generating as a command list of register data; means for recalling a recorded command list from memory and submitting the command list to the graphics system; and means for selectively controlling which of the means for directly writing, the means for recording and the means for recalling are utilized in generating the register data.

The foregoing and other features and advantages of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

Figure 1:
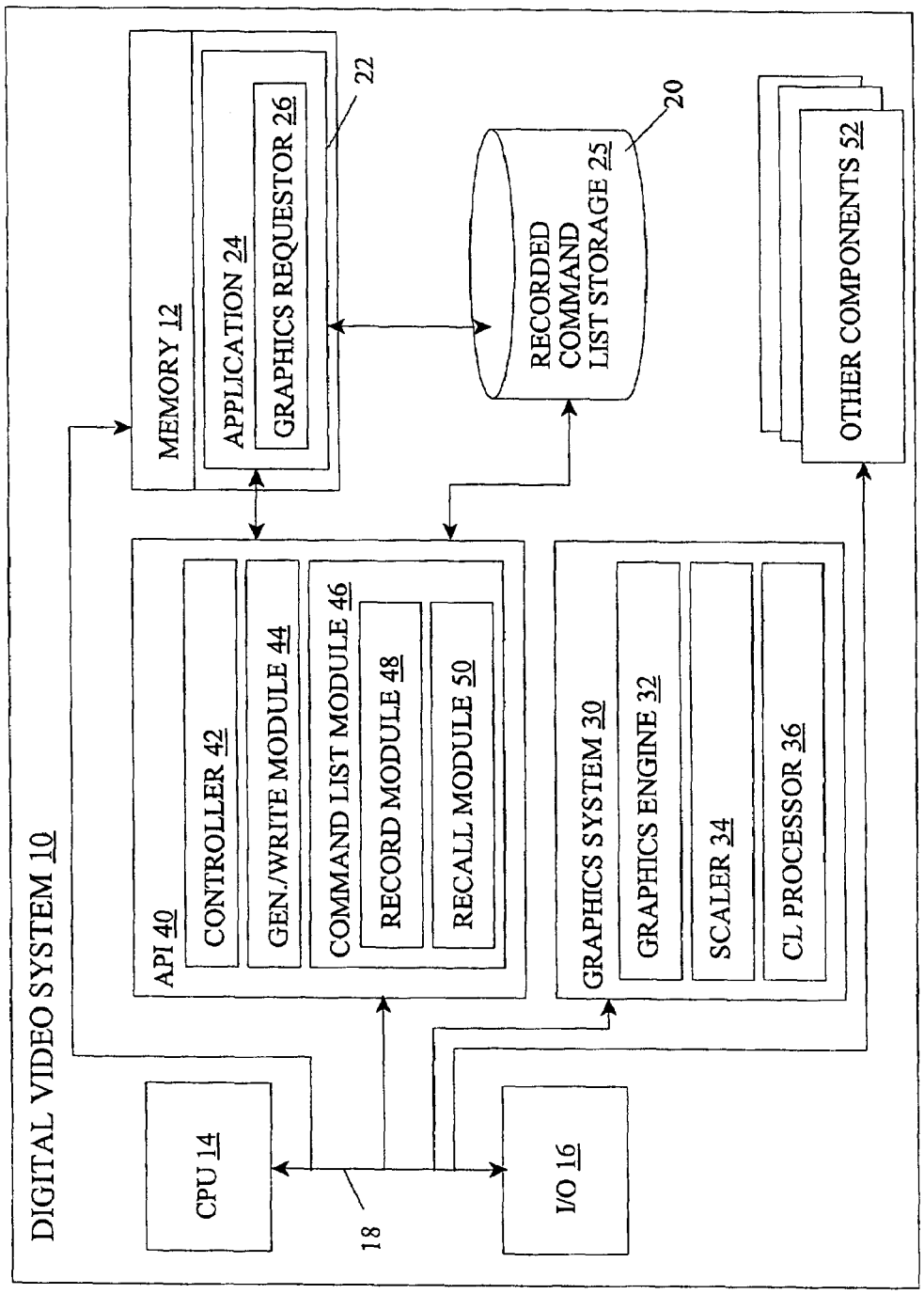
FIG. 1 shows a block diagram of a digital video system 10.

For convenience purposes only, the following subtitles have been provided:
I. Digital Video System Overview
II. Graphics System
III. Application Program Interface
IV. Application
V. Method I. Digital Video System Overview FIG. 1 is a block diagram of a digital video system 10. Digital video system 10 includes a memory 12, a processor (CPU) 14, input/output devices (I/O) 16 and a bus 18. A database 20 may also be provided for storage of data relative to processing tasks. Memory 12 includes a program product 22 that, when executed by CPU 14 comprises various functional capabilities of system 10. Memory 12 (and database 20) may comprise any known type of data storage system and/or transmission media, including magnetic media, optical media, random access memory (RAM), read only memory (ROM), a data object, etc. Moreover, memory 12 (and database 20) may reside at a single physical location comprising one or more types of data storage, or be distributed across a plurality of physical systems.

Processor 14 may likewise comprise a single processing unit, or a plurality of processing units distributed across one or more locations. In one embodiment, digital video system 10 is a set top box configured to provide various digital television service functionality including generating graphics for overlay in a television display. In this setting, processor 14 may comprise an IBM PowerPC® CPU. Processor 14 is designed to drive the operation of the particular hardware and is compatible with other system components and I/O controllers. I/O 16 may comprise any known type of input/output device including a network system, modem, keyboard, mouse, scanner, voice recognition system, CRT, printer, disc drives, cable system, etc.

Program product 22 may include an application 24 that provides the various functional capabilities of digital video system 10. In one embodiment, application 24 includes a graphics requester 26, which will be described in greater detail below.

Digital video system 10 also includes a graphics system 30 that includes a graphics engine 32, a scaler 34 and a command list processor 36. An application program interface (API) 40 is provided for communication between application 24 and graphics system 30. API 40 includes a controller 42, a generate module 44 and a command list module 46. Command list module 46 may include a record module 48 and a recall module 50. Additional components 52, such as cache memory, communication systems, digital-analog encoder, etc., may also be incorporated into system 10.

The above delineated components of digital video system 10 enable an application 24 to request construction of a graphic using API 40 and graphics system 30. As will be described in more detail below, API 40 provides the ability to do at least one of: 1) generate register data based on a request from application 24 and write the register data to registers of graphics system 30 for execution; 2) record a command list of register data in memory 20 as the register data is generated; and 3) recall a recorded command list of register data and submit the command list to graphics system 30 for execution. A "command list," as used herein, is a list of register data. "Register data," as used herein, is an address/data pair where each address/data pair specifies the appropriate graphics system component (i.e., graphics engine, scaler or command list processor) device control register address and a data value to be written to that register address. In one embodiment, command lists are created for frequently used graphic features. For example, register data for constructing a rectangle may be used frequently enough to substantiate recording as a command list.

II. Graphics System

As noted above, graphics system 30 includes a graphics engine 32, a scaler 34 and a command list processor 36. Graphics engine 32 is hardware that performs graphics processing tasks based on requests from application 24. Scaler 34 is hardware that performs enlargement or reduction of graphics based on requests from application 24. Command list processor 36 is hardware that performs distribution of a command list into graphics engine 32 and/or scaler 34 based on instructions from API 40 without processor 14 intervention.

III. Application Program Interface

As indicated above, application program interface (API) 40 is provided for communication between application 24 and graphics system 30. API 40 provides the ability to do at least one of: 1) generate register data based on a request from application 24 and write the register data to registers of graphics system 30 for execution; 2) record a command list of register data in memory 20 as the register data is generated; and 3) recall a recorded command list of register data and submit the command list to graphics system 30 for execution.

In order to accomplish the above tasks, API 40 includes a controller 42, a generate/write module 44 and a command list module 46. Controller 42 receives graphics construction requests from application 24 and implements appropriate modules, i.e., generate module 44 and/or command list module 46.

Controller 42 of API 40 determines which of the above three functions the application wants to perform. The determination of which tasks are to be implemented can occur in a couple of ways. In one embodiment, the determination can be made by a particular indicator being sent from application 24, i.e., application 24 determines which tasks will provide the most efficient implementation. For instance, if application 24 requires register data to be generated and written to graphics system 30, a 'direct write indicator' may be sent with the request. If application 24 wants to record register data as it is generated as a command list for later use, a 'record indicator' may be sent with the request. If application 24 wants to recall a command list, a 'recall indicator' may be sent with the request. The above-described indicators may be used alone or in combination within a request for a graphic. In a second embodiment, controller 42 may simply receive the request and determine which tasks should be used to efficiently construct the graphic. This may be accomplished in a variety of ways. For instance, a particular graphic may be constructed a number of times after which a command list is created for later use, or a particular graphic may be known to be used frequently such that a command list is recorded earlier. In another example, defaults may be preset to determine which tasks to conduct.

When it is determined that register data needs to be generated, generate/write module 44 is implemented by controller 42 to calculate register data, i.e., address/data pairs, necessary for graphics system to construct the graphic. The calculations are made by API 40 accessing processor 14. In order to calculate the register data, generate module 44 accesses processor 14 to perform the calculations in real time. Generate/write module 44 also may be instructed to write the register data to graphics system 30, e.g., by a 'direct write indicator'. In this case, generate/write module 44 writes the generated register data to appropriate graphics system components, i.e., graphics engine 32 and/or scaler 34. Graphics system 30 would then execute the register data written thereto to construct the graphic.

When it is determined that register data should be recorded as a command list for later use, controller 42 implements command list module 46 and, in particular, record module 48 to record the register data as a command list. In this setting, generate/write module 44 generates the register data, but does not write it to the appropriate registers of graphics system 30. Rather, record module 48 allocates memory, e.g., in database 20, for register data (i.e., command list) and sets a command list memory variable to the starting address of the allocated memory. As the register data is generated, the command list memory variable is incremented for the next address/data pair and the process repeats for each address/data pair required for the graphic. A list of recorded command lists is also maintained for access by application 24 and/or API 40. Each command list includes sufficient register data, i.e., address/data pairs, to create a particular graphic.

When it is determined that a command list should be recalled, API 40 points command list module 46 and, in particular, recall module 50 to the memory location of a recorded command list. Recall module 50 then accesses recorded command list storage 25 to recall a requested command list. Command list module 46 then passes the command list to command list processor 36 of graphics system 30 for distribution of the register data, i.e., address/data pairs, in the command list to the appropriate graphics engine 32 and/or scaler 34 registers. Command list processor 36 can then execute on the register data in hardware logic of graphics system 30, i.e., using graphics engine 32 and/or scaler 34, to construct the requested graphic. Compared to direct generation and writing of register data, implementation of a command list is processor 14 independent because register data does not have to be calculated by the processor. As a result, processor 14 is free to execute other tasks. Command list processor 36 also provides pacing control of graphics engine 32 and scaler 34, and supports animation without processor 14 intervention.

Use of API 40 allows for construction of a graphic to be implemented in a much more efficient manner. In particular, whenever a command list can be utilized, API 40 provides a mechanism to construct a graphic without repeatedly calculating register data. For instance, a sample API may only need to know the following parameters: fill color, format of destination (RGB32 or 16, YCBCR, etc.), pointer to base address, destination x, destination y, destination stride, destination width, and destination height. With these parameters, API 40 can call an appropriate command list and application 24 can adjust the above parameters in the command list to create a unique graphic or reuse a graphic.

Each graphic may be constructed using a variety of generated register data and recalled command list(s). This functionality greatly increases the speed and efficiency at which graphics can be constructed. In addition, command list(s) can also be recalled and then modified using generate/write module 42 prior to submission to command list processor 36, which provides even more latitude in graphic design. Furthermore, combination of command lists can be accommodated such that complex operations can be constructed easily by combining multiple command lists.

It should be recognized that although API 40 is illustrated as being separate from graphics system 30 and available to application 24, API 40 may be an internal component of the graphics system. Requests for command list(s) would be generated by graphics system 30 and/or application 24. Similarly, modification and combining of command lists would be conducted by graphics system 30.

IV. Application

The invention also includes application 24 that is capable of requesting construction of a graphic. As described above, application 24 accesses graphics system 30 using API 40. A graphics requester 26 is included as part of application 24 and can request API 40 to conduct at least one of the above described tasks. That is, 1) generate register data for graphics system 30 (using generate module 44) and write the register data to the graphics system; 2) record register data as a command list as the register data is generated (using command list module 46 and record module 48); and 3) recall a recorded command list of register data (using command list module 46 and record module 50) and submit it to graphics system 30 (command list processor 36). Graphics requestor 26 is also capable of selecting from the list of recorded command lists, i.e., from recorded command list storage 25, where use of a command list is possible.

In addition to providing more efficient graphics construction, application 24 and API 40 are also helpful relative to application programming. In particular, application 24 and API 40 can be provided to application programmers with prerecorded command lists. Hence, API 40 provides all of the functionality of graphics engine 32 and scaler 34 to applications without requiring a programmer to have in-depth knowledge of the graphics system hardware. As a result, a less knowledgeable programmer may be able to program application 24 knowing that particular recorded command lists are available to the application. For example, a programmer may be able to recall a recorded command list, present the command list to the command list processor 36 to display the initial graphic, modify a single command list line to change a parameter, e.g., an X-Y coordinate, of the graphic and present the modified command list to processor 36 to move the graphic on the display. This process could then be re-used, perhaps in a simple loop to perform an animation.

V. Method

The invention also includes a method of generating register data for registers of a graphics system, the method comprising: at least one of the steps of: generating register data based on a request and writing the register data to the registers of the graphics system for execution; recording a command list of register data in memory as the register data is generated; and recalling a recorded command list of register data and submitting the command list to the graphics system for execution. The step of generating may be conducted using processor 14, and the steps of recording and recalling may be conducted using hardware logic, as described above. The method may also include the step of modifying the recorded command list prior to the step of submitting. Further, the step of recalling may include recalling a plurality of command lists and submitting the plurality of command lists to the graphics system for execution. The method may further comprise the step of receiving an indicator from an application indicating which of the at least one steps to conduct. Also, the method may include the step of determining which steps to conduct using API 40 of graphics system 30.

In the previous discussion, it will be understood that the method steps discussed are performed by a processor, such as CPU 14 of system 10, or hardware logic, such as graphics engine 32, executing instructions of program product 22 or API 40 stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. Hardware described above may also be provided as separate entities accessible to system 10. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

It should also be recognized that the particular modules disclosed can be further compartmentalized or provided as separate APIs. In addition, while the invention has been disclosed relative to a digital video system and a graphics system, the teachings of the invention are applicable to any system and hardware.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method of generating register data for registers of a graphics system, the method comprising:
    at least one of the steps of:
        generating register data based on a request and writing the register data to the registers of the graphics system for execution; recording a command list of register data in memory as the register data is generated; and recalling a recorded command list of register data and submitting the command list to the graphics system for execution.

2. The method of claim 1, wherein the step of generating is conducted using a processor, and the steps of recording and recalling is conducted using hardware logic.

3. The method of claim 1, further comprising the step of modifying the recorded command list prior to the step of submitting.

4. The method of claim 1, wherein the step of recalling includes recalling a plurality of command lists and submitting the plurality of command lists to the graphics system for execution.

5. The method of claim 1, further comprising the step of receiving an indicator from an application indicating which of the at least one steps to conduct.

6. The method of claim 1, further comprising the step of determining which steps to conduct using an application program interface of the graphics system.

7. An application program interface for generating register data for a graphics system based on a request, the interface comprising:
    a generate module that generates register data and writes the register data to the graphics system for execution;
    a command list module including:
        a record module that records register data generated by the generate module as a command list in memory;
        a recall module that recalls a command list from memory and submits the command list to the graphics system for execution; and
    a controller that determines which of at least one of the generate module, the record module and the recall module will be utilized to respond to the request.

8. The interface of claim 7, wherein the graphics system includes a graphics engine, a scaler and a command list processor.

9. The interface of claim 8, wherein the command list processor distributes register data to at least one of the graphics engine and the scaler.

10. The interface of claim 7, wherein the generate module utilizes a processor to generate the register data, and the command list module utilizes hardware logic.

11. The interface of claim 7, wherein the generate module is configured to modify the command list prior to submitting the command list to the graphics system.

12. The interface of claim 7, wherein the recall module recalls a plurality of command lists and submits the plurality of command lists to the graphics system for execution.

13. The interface of claim 12, wherein the generate module is configured to modify the plurality of command lists prior to submission to the graphics system.

14. The interface of claim 7, wherein the controller determines which module to utilize based on an indicator from an application.

15. A digital video system comprising:
    a processor;
    a memory;
    a graphics system for generating graphics;
    an application resident in memory;
    an application program interface for the graphics system including:
        means for generating register data and writing the register data to the graphics system;
        means for recording in memory register data created by the means for generating as a command list of register data;
        means for recalling a recorded command list from memory and submitting the command list to the graphics system; and
        means for selectively controlling which of the means for directly writing, the means for recording and the means for recalling are utilized in generating the register data.

16. The system of claim 15, wherein the graphics system includes a graphics engine, a scaler and a command list processor.

17. The system of claim 16, wherein the command list processor distributes register data to at least one of the graphics engine and the scaler.

18. The system of claim 15, wherein the means for generating modifes the command list prior to the means for recalling submitting the command list to the graphics system.

19. The system of claim 15, wherein the means for recalling recalls a plurality of command lists and submits the plurality of command lists to the graphics system for execution.

20. The system of claim 19, wherein the means for generating modifies the plurality of command lists prior to submission to the graphics system.

* * * * *